US009135023B2

(12) United States Patent
Zhang et al.

(10) Patent No.: US 9,135,023 B2
(45) Date of Patent: Sep. 15, 2015

(54) ALIGNING USER INTERFACE ELEMENTS

(75) Inventors: Kaicheng Zhang, Beijing (CN); Xin Zhou, Beijing (CN); Jesse Shieh, Alpharetta, GA (US); Ka Cheong Lui, Beijing (CN); Jing Zhao, Beijing (CN); Jia Sheng, Beijing (CN)

(73) Assignee: Google Inc., Mountain View, CA (US)

( * ) Notice: Subject to any disclaimer, the term of this patent is extended or adjusted under 35 U.S.C. 154(b) by 192 days.

(21) Appl. No.: 13/508,026

(22) PCT Filed: Nov. 13, 2009

(86) PCT No.: PCT/CN2009/001255
§ 371 (c)(1),
(2), (4) Date: May 3, 2012

(87) PCT Pub. No.: WO2011/057428
PCT Pub. Date: May 19, 2011

(65) Prior Publication Data
US 2012/0218309 A1 Aug. 30, 2012

(51) Int. Cl.
*G09G 5/00* (2006.01)
*G06F 9/44* (2006.01)

(52) U.S. Cl.
CPC .................... *G06F 9/4443* (2013.01)

(58) Field of Classification Search
CPC . G06F 3/0486; G06F 3/04805; G06F 3/0482; G06F 3/0484; G06T 11/60
USPC .......... 345/674, 676, 677; 715/217, 219, 220, 715/243, 253, 674, 676, 677
See application file for complete search history.

(56) References Cited

U.S. PATENT DOCUMENTS

| | | | | |
|---|---|---|---|---|
| 6,377,285 | B1* | 4/2002 | Doan et al. | 715/764 |
| 2003/0028560 | A1* | 2/2003 | Kudrolli et al. | 707/509 |
| 2006/0200762 | A1* | 9/2006 | Marmorstein et al. | 715/517 |
| 2008/0301547 | A1* | 12/2008 | Karunakaran et al. | 715/244 |
| 2009/0183109 | A1 | 7/2009 | Dan | |
| 2010/0275114 | A1* | 10/2010 | Bastos dos Santos et al. | 715/228 |
| 2011/0289398 | A1* | 11/2011 | Chin | 715/227 |
| 2013/0125050 | A1* | 5/2013 | Goshey | 715/800 |

FOREIGN PATENT DOCUMENTS

CN 1648847 8/2005
CN 101183353 5/2008

OTHER PUBLICATIONS

International Search Report and Written Opinion in International Application No. PCT/CN2009/001255, mailed Aug. 26, 2010, 10 pages.

* cited by examiner

*Primary Examiner* — Todd Buttram
(74) *Attorney, Agent, or Firm* — Fish & Richardson P.C.

(57) ABSTRACT

Methods, systems, and apparatus, including computer program products, for aligning user interface elements arranged in multiple columns in a user interface. In one aspect, a method includes identifying a group of columns in a user interface, where each column in the group includes one or more user interface elements arranged in a sequence from a top of the column to a bottom of the column; comparing heights of first sequences of one or more user interface elements in a first column to heights of second sequences of one or more user interface elements in a second column; and adjusting the heights of the first sequences to align the first sequences with the second sequences by adjusting the heights of user interface elements in the first sequences, where adjustments to each user interface element in the first sequences are each less than a threshold adjustment value.

18 Claims, 9 Drawing Sheets

ALIGNING USER INTERFACE ELEMENTS

BACKGROUND

This specification relates to aligning user interface elements.

Conventional user interfaces, e.g., of a web page, or a program application, can include one or more user interface elements, e.g., text boxes, windows, or application gadgets. Some user interfaces have layouts that include multiple columns. User interface elements can be arranged in the multiple columns based on predetermined presentation attributes. In some web pages, presentation attributes are defined within the HyperText Markup Language (HTML) markup or in Cascading Style Sheets (CSS). As an example, the height and width of columns can be defined, and sizes of and locations for presenting user interface elements in the columns can also be defined within the HTML markup or CSS.

SUMMARY

This specification describes technologies relating to automatically aligning user interface elements across multiple columns of a user interface.

In general, one aspect of the subject matter described in this specification can be embodied in methods that include the actions of identifying a group of columns in a user interface, where each column in the group includes one or more user interface elements arranged in a sequence from a top of the column to a bottom of the column; comparing heights of first sequences of one or more user interface elements in a first column to heights of second sequences of one or more user interface elements in a second column; and adjusting the heights of the first sequences of one or more user interface elements in the first column to align the first sequences with the second sequences by adjusting the heights of user interface elements in the first sequences, where adjustments to each user interface element in the first sequences are each less than a threshold adjustment value. Other embodiments of this aspect include corresponding systems, apparatus, and computer program products.

The foregoing and following embodiments can optionally include one or more of the following features. The method further includes identifying a reference user interface element, where the reference user interface element is a user interface element in the second column that, when compared to other user interface elements in the other columns in the group, maximizes a number of other columns in the group that include user interface elements that can be aligned with the reference user interface element using adjustments less than the threshold adjustment value. The comparing includes comparing heights of first sequences that include only user interface elements that have not been previously adjusted.

The method further includes monitoring the user interface for a trigger event, and where the identifying, comparing and adjusting is performed automatically in response to detecting the trigger event. The trigger event indicates that a user interface element has been deleted or modified. The trigger event indicates that a user interface element has been loaded. The adjusting includes increasing the height of a user interface element. Each of the one or more user interface elements in a first sequence has a substantially equal height after being adjusted. The columns are horizontal columns. A first sequence and a second sequence are not aligned before the adjustment.

In general, another aspect of the subject matter described in this specification can be embodied in a computer program product, stored on a computer-readable medium, operable to cause data processing apparatus to perform operations including identifying a group of columns in a user interface, where each column in the group includes one or more user interface elements arranged in a sequence from a top of the column to a bottom of the column; comparing heights of first sequences of one or more user interface elements in a first column to heights of second sequences of one or more user interface elements in a second column; determining adjustments for the heights of each user interface element in the first sequences to align the first sequences with the second sequences; comparing each adjustment to a threshold adjustment value; determining that first adjustments for user interface elements in a first group of first sequences are less than the threshold adjustment value, and adjusting the heights of the user interface elements in the first group; and determining that second adjustments for user interface elements in a second group of first sequences are greater than the threshold adjustment value, and identifying the second adjustments as not being accepted adjustments for aligning the first sequences. Other embodiments of this aspect include corresponding systems, apparatus, and methods.

The foregoing and following embodiments can optionally include one or more of the following features. The operations further include identifying a reference user interface element, where the reference user interface element is a user interface element in the second column that, when compared to other user interface elements in the other columns in the group, maximizes a number of other columns in the group that include user interface elements that can be aligned with the reference user interface element using adjustments less than the threshold adjustment value. The comparing includes comparing heights of first sequences that include only user interface elements that have not been previously adjusted.

The operations further include monitoring the user interface for a trigger event, and where the identifying, comparing and determining is performed automatically in response to detecting the trigger event. The trigger event indicates that a user interface element has been deleted or modified. The trigger event indicates that a user interface element has been loaded. The adjusting includes increasing the height of a user interface element. Each of the one or more user interface elements in a first sequence has a substantially equal height after being adjusted. The columns are horizontal columns.

Particular embodiments of the subject matter described in this specification can be implemented to realize one or more of the following advantages. Automatically aligning user interface elements makes the presentation of the user interface elements in a user interface more organized. As a result, how much user interaction is required to locate and interact with a particular user interface element is reduced. In addition to saving time and improving the appearance of the user interface, improving the organization of the user interface elements can increase the effective use of available space (i.e., "real estate") in the user interface.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements. Note that FIGS. 3A, 3B, 3C, 3D, 4, and 5 are not drawn to scale.

DETAILED DESCRIPTION

Figure 1:
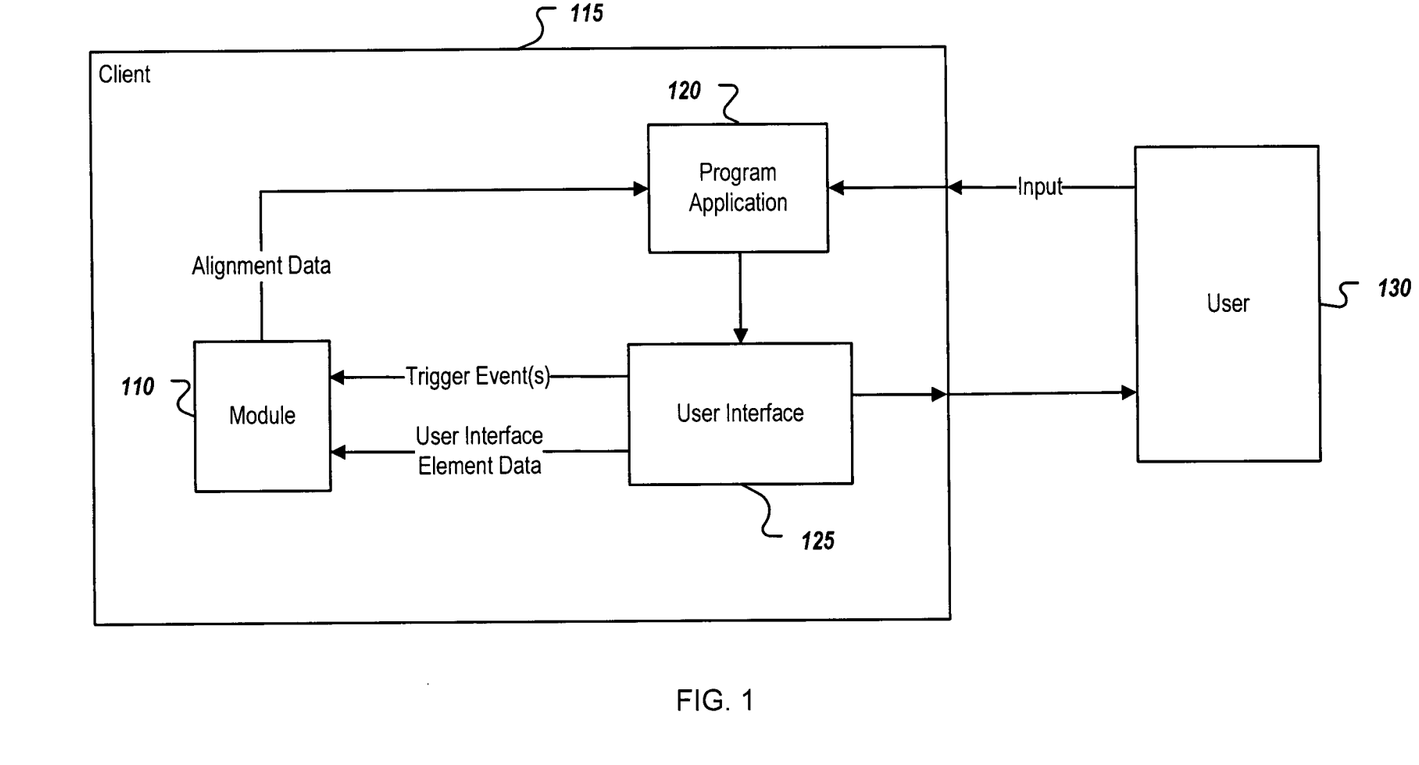
FIG. 1 is a block diagram illustrating an example of a flow of data in some implementations of a system that automatically generates alignment data for aligning user interface elements.

FIG. 1 is a block diagram illustrating an example of a flow of data in some implementations of a system that automatically generates alignment data for aligning user interface elements. A module 110, e.g., a JavaScript script, installed on a client 115 (a computer) monitors a program application 120. In some implementations, the program application 120 is a web browser, and the module 110 is plug-in software that is installed in the web browser running on the client 115.

The module 110 requests and receives user interface element data from the user interface 125 of the program application 120. The user interface element data can include data that identifies numbers and types of user interface elements in the user interface 125 and presentation attributes of the user interface elements. Examples of presentation attributes of a user interface element include height (or length), width, layout properties (e.g., CSS layout properties "float" and "clear" that can be used to present the user interface element in a column), and padding (i.e., the space between the edge of the user interface element and its contents). In some implementations, where the program application 120 is a web browser, the presentation attributes are generally defined by a Cascading Style Sheet associated with a web page that is being displayed in the web browser. In some implementations, the layout of the user interface 125 for presenting user interface elements is not grid-based.

The module 110 monitors the user interface 125 of the program application 120 for changes to the presentation of user interface elements in the user interface 125. In some implementations, the module 110 monitors the user interface 125 for trigger events. The trigger events can include requests to resize, load, refresh, delete, move, or modify presentation attributes of a user interface element in the user interface 125. In some implementations, the user interface elements are automatically aligned by the module 110 after the module 110 detects a trigger event. The trigger events can be specified by setting user preferences.

In some implementations, after a first trigger event is detected, the module 110 periodically checks the user interface 125 particularly for changes to sizes of user interface elements, e.g., increases or decreases in height. If no changes are detected after a predetermined number of checks, the module 110 discontinues the checks. As an example, after detecting that a first user interface element was moved, the module 110 can check every 500 ms for three seconds (i.e., six checks). If in the three seconds, the height of a user interface element is changed, then the user interface elements are automatically aligned, and the module 110 checks every 500 ms for another three seconds.

The module 110 processes the user interface element data to generate alignment data for aligning the user interface elements. The alignment data can include adjustments for the height (length) or width of each of one or more user interface elements displayed in the user interface 125. The module 110 applies the alignment data to the one or more user interface elements to align the user interface elements. In some implementations, the module 110 uses the alignment data to modify the presentation attributes of a user interface element in a CSS or in HTML markup. In some implementations, the alignment data is applied to increase the padding of a user interface element. In some alternative implementations, the alignment data is applied to increase the blank space between user interface elements.

The module 110 can apply the alignments in real time, i.e., as the user is providing input to resize, load, refresh, delete, move, or modify presentation attributes of a user interface element in the user interface 125. For example, the module 110 can align the user interface elements in response to the user providing an input to resize a first user interface element but before the user provides a subsequent input to load a second user interface element. In particular, when the first user interface element is resized, the edges of user interface elements in the same column as the first user interface element, that were previously aligned with user interface elements in another column, may be shifted so that they do not align with user interface elements in the other column.

In addition, when the second user interface element is loaded, the "natural" dimension (e.g., height) of the second user interface element may cause the other user interface elements in the same column to shift so that they are no longer aligned. The dimension can be considered "natural" because it is a default or initial dimension of the user interface element provided for rendering in the user interface, e.g., before any adjustments, when an input to load the user interface element is first received. As an example, such a shift may occur if the second user interface element is loaded at the top of the column or in between two user interface elements in the column.

Figure 2:
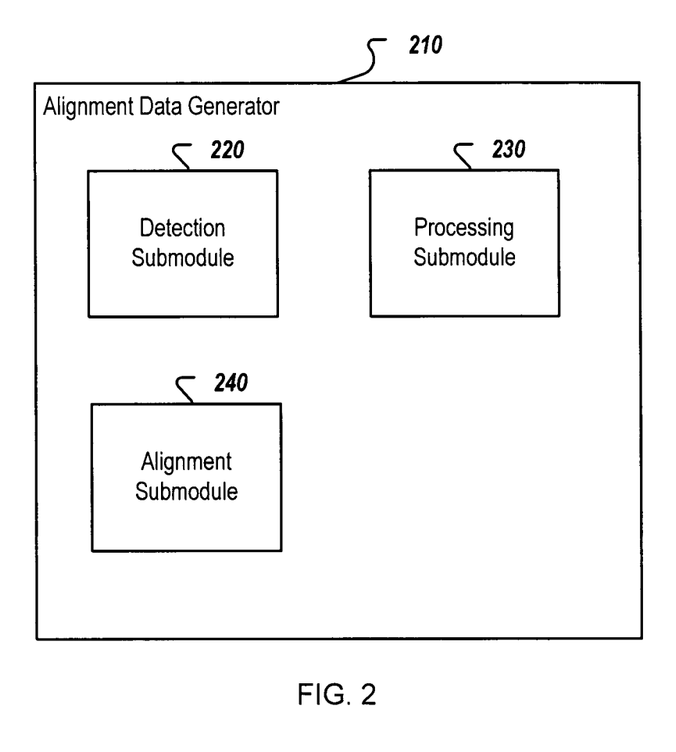
FIG. 2 is a block diagram illustrating an example alignment data generator.

FIG. 2 is a block diagram illustrating an example alignment data generator 210. The alignment generator 210 includes a detection submodule 220, a processing submodule 230, and an alignment submodule 240. The detection submodule 220 monitors the program application 120 and the user interface 125 for trigger events, including detecting changes to the height of a user interface element in the user interface 125.

In some implementations, the detection submodule 220 includes an event handler. The event handler generates calls to a communication engine that sends to the processing submodule 230 and the alignment submodule 240 asynchronous requests for alignment data. In some implementations, the detection submodule 220 generates a call to the processing submodule 230 and the alignment submodule 240 immediately after detection of each trigger event, e.g., after each change to a user interface element. As a result, the user interface elements can be aligned dynamically as a user 130 or the program application 120 modifies the presentation of the user interface elements in the user interface 125.

In some alternative implementations, the detection submodule 220 implements a delay, waiting a predetermined amount of time before automatically making the request to the processing submodule 230 and the alignment submodule

240. The predetermined amount of time is specified in the module 110. The predetermined amount of time can be any amount of time, e.g., 0 ms, 500 ms, greater than or equal to 0. In practice, the predetermined amount of time typically falls in a range between 0 ms and 1,000 ms. In some implementations, the user 130 can specify the predetermined amount of time by setting user preferences.

The processing submodule 230 obtains user interface element data from the user interface 125 of the program application 120. The processing submodule 230 processes the user interface element data, as described in further detail below, to generate alignment data, and the alignment submodule 240 uses the alignment data to align the user interface elements.

Figure 3A:
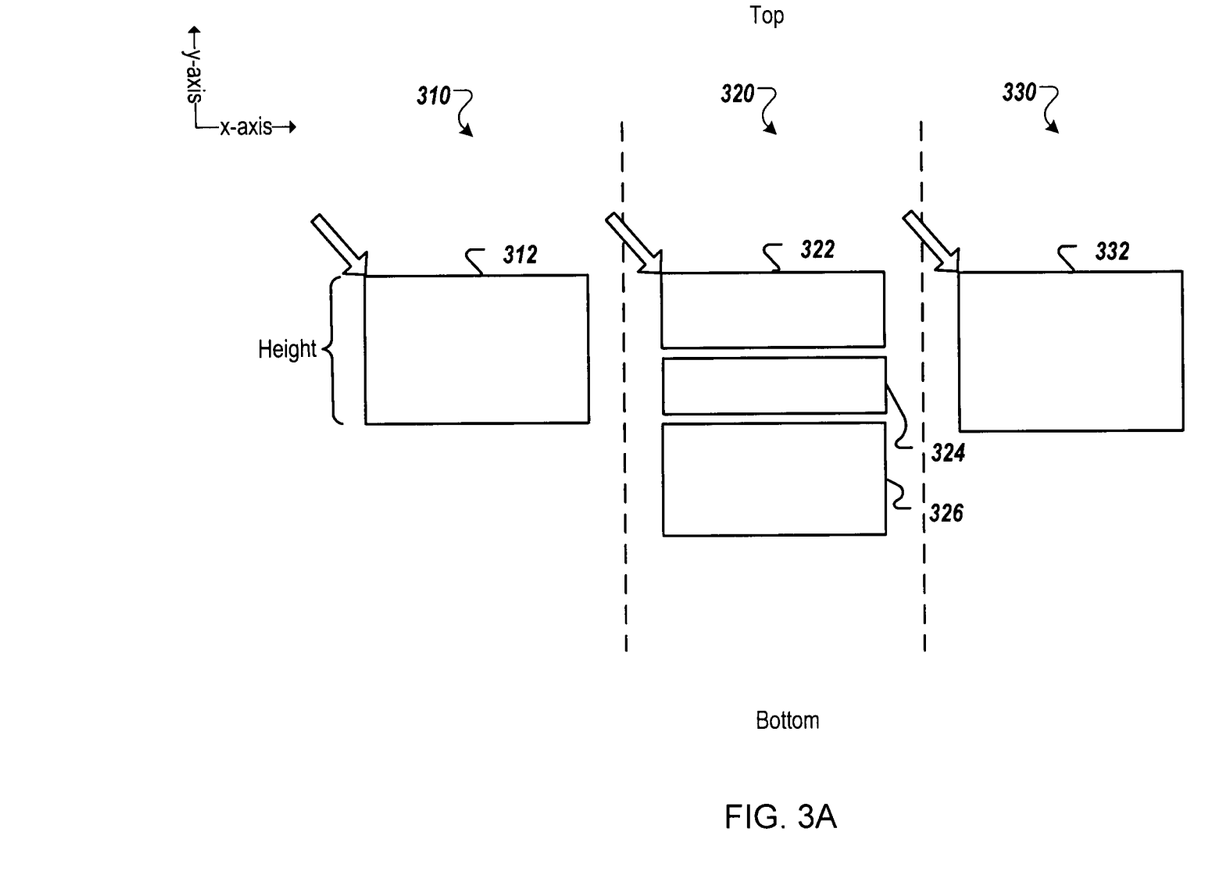
FIG. 3A is a block diagram illustrating example user interface elements arranged in three vertical columns.

FIG. 3A is a block diagram illustrating example user interface elements arranged in three vertical columns. The three vertical columns, including a first column 310, a second column 320, and a third column 330, are indicated by the vertical dotted lines that run parallel to the y-axis (e.g., a vertical dimension). In practice, the dotted lines are not displayed. The first column 310 includes a user interface element 312, the second column 320 includes user interface elements 322, 324, and 326, and the third column 330 includes a user interface element 332. The user interface elements can each have a different height, i.e., the dimension of the user interface element parallel to the y-axis in FIG. 3A.

Because each user interface element may have a different height, the user interface elements in adjacent columns may not be aligned across the adjacent columns. In particular, the edges of user interface elements that are parallel to the x-axis in FIG. 3A may not align.

User interface elements 312, 322, and 332 can be considered to be at the top of their respective columns as indicated by the label "Top". The top edge of each of the user interface elements 312, 322, and 332, i.e., the edge of each user interface element parallel to the x-axis and nearest "Top", are typically aligned. The bottom edge of each of the user interface elements 312, 322, and 322, i.e., the edge of each user interface element parallel to the x-axis and nearest "Bottom", may not be aligned (e.g., the bottom edges may not run along lines within W pixels of each other, where 0≤W≤50 pixels), because the user interface elements 312, 322, and 322 each have different heights.

In addition, the bottom edge of the user interface element 324 is not aligned with the bottom edge of the user interface element 312, and the bottom edge of the user interface element 326 is not aligned with the bottom edge of the user interface element 332. In particular, the cumulative height of the sequence of consecutive user interface elements 322 and 324, including blank space between user interface elements 322 and 324, is not equal to the height of the user interface element 312. As a result, the bottom edge of the user interface element 312 does not align with the bottom edge of the user interface element 324. In addition, the cumulative height of the sequence of consecutive user interface elements 322, 324, and 326, including blank space between user interface elements 322, 324, and 326, is not equal to the height of the user interface element 332. As a result, the bottom edge of the user interface element 332 does not align with the bottom edge of the user interface element 326.

By processing user interface element data associated with the user interface elements, the module 110 can determine a number of columns and user interface elements arranged in each column of the user interface. In the example, the module 110 can identify the user interface element 312 as being arranged in the first column 310; user interface elements 322, 324, and 326 as being arranged in the second column 320 that is adjacent to the first column 310; and the user interface element 332 as being arranged in the third column 330 that is adjacent to the second column 320.

Aligning user interface elements across multiple columns includes determining adjustments to the heights of the user interface elements that are applied to align the bottom edges of the user interface elements. The adjustments are less than a threshold adjustment value, e.g., less than 50 pixels. Adjustments that are less than the threshold adjustment value can be referred to as accepted adjustments. Adjustments identified as not being accepted adjustments are not used to align user interface elements. In some implementations, the adjustments are used only to increase the height of a user interface element. In addition, the threshold adjustment value can be specified by setting user preferences.

In some implementations, the dimensions, e.g., height (length) and width, of a user interface element can be measured in pixels. For example, the user interface element 312 can have a height of 400 pixels, the user interface element 322 can have a height of 200 pixels, the user interface element 324 can have a height of 180 pixels, the user interface element 326 can have a height of 300 pixels, and the user interface element 332 can have a height of 410 pixels. In addition, the threshold adjustment value can be 50 pixels, and the adjustments only increase the height of a user interface element.

In some implementations, pointers are associated with each of the columns to indicate which sequences of one or more user interface elements in each column are being compared and considered for adjustment. The pointers are initially associated with user interface elements at the top of the columns. In FIG. 3A, a first pointer is initially associated with the user interface element 312, a second pointer is initially associated with the user interface element 322, and a third pointer is initially associated with the user interface element 332.

Comparing the user interface element 312 in the first column 310 with the user interface element 322 in the second column 320 and the user interface element 332 in the third column 330, the module 110 determines that neither the height of the user interface element 322 nor the height of the user interface element 332 can be adjusted using an adjustment within the threshold adjustment value to align the user interface element 322 or the user interface element 332 with the user interface element 312. In particular, the height of user interface element 322 must be increased by 200 pixels, which is greater than the threshold adjustment value. In addition, the height of the user interface element 332 cannot be increased to align with the user interface element 312. The module 110 determines that the height of the user interface element 312 can be increased using an adjustment less than the threshold adjustment value to align the user interface element 312 with the user interface element 332. In particular, the height of the user interface element 312 can be increased by 10 pixels.

In some implementations, user interface elements are adjusted only one time during a single alignment iteration, e.g., a first iteration initiated in response to detection of a first trigger event, or a second iteration initiated in response to detection of a subsequent second trigger event. The module 110 can associate each user interface element with an alignment indication value that indicates whether the user interface element has already been adjusted during a particular alignment iteration. For example, an alignment indication value of zero can indicate that the height of the user interface element has not been adjusted for alignment during the particular alignment iteration. An alignment indication value of one can indicate that the height of the user interface element has been adjusted for alignment during the particular alignment iteration, and the user interface element should not be adjusted again during the particular alignment iteration. After each alignment iteration is completed, the alignment indication values can be reset to indicate that the user interface elements have not been adjusted for a next iteration.

Returning to the example, the alignment indication value of the user interface element 312 can be modified to indicate that the user interface element 312 should not be further adjusted. After the user interface elements that are associated with pointers are compared (and adjusted in particular situations), a pointer can be moved to begin a comparison of another group of user interface elements. In particular, the pointer that is moved is the pointer that is associated with a user interface element that has a bottom edge that is nearest the top of the columns.

As an example, assuming that the top edges of the user interface elements 312, 322, and 332 run along a reference line with a y-position of 0, the bottom edge of user interface element 312 can be considered to be located at y-position 400 (i.e., a distance of 400 pixels from the reference line with a y-position of 0), the bottom edge of the user interface element 322 can be considered to be located at y-position 200 (i.e., a distance of 200 pixels from y-position 0), and the bottom edge of the user interface element 332 can be considered to be located at y-position 410 (i.e., a distance of 410 pixels from y-position 0).

Figure 3B:
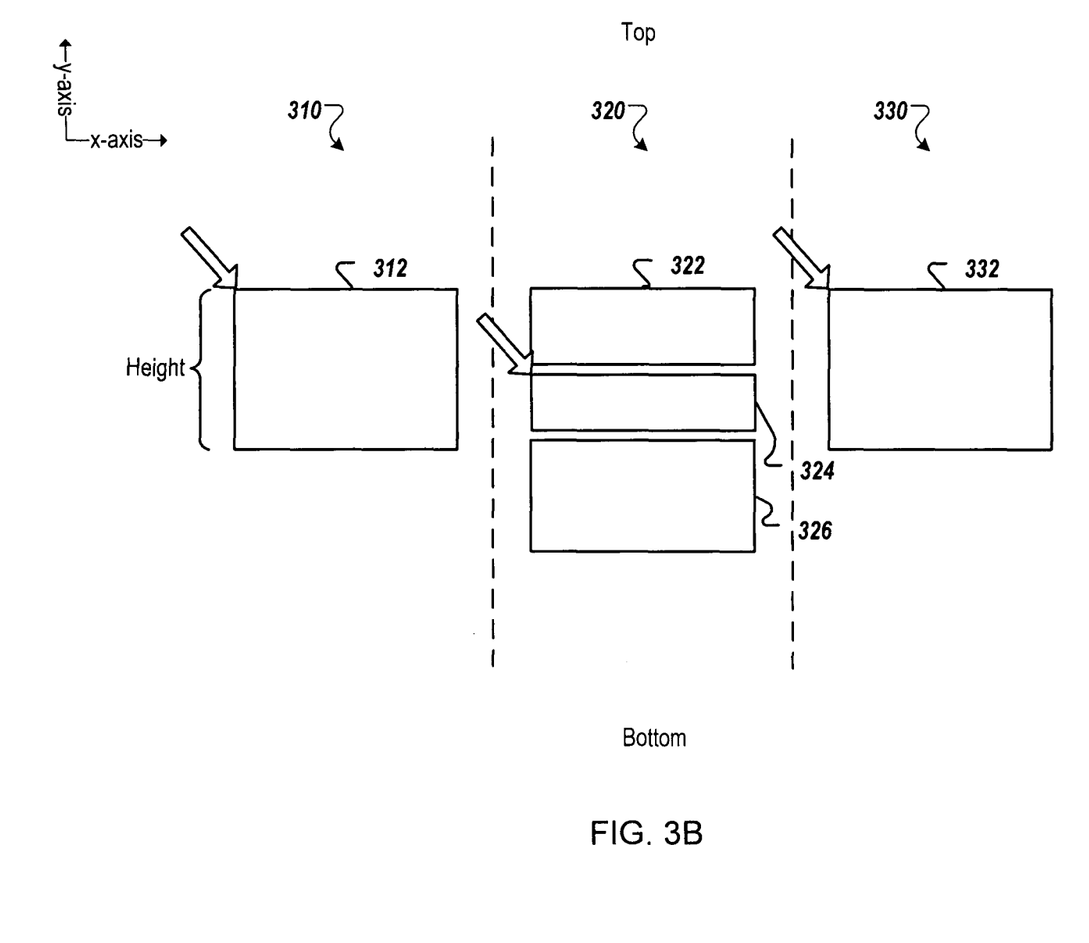
FIG. 3B is a block diagram illustrating the example user interface elements of FIG. 3A after a user interface element is aligned.

FIG. 3B is a block diagram illustrating the example user interface elements of FIG. 3A after a user interface element is aligned. In particular, the user interface 312 has been adjusted so that it is aligned with the user interface element 332.

Because the second pointer was associated with the user interface element 322 that has a bottom edge nearest the top of the columns relative to user interface elements pointed to by the other pointers, as shown in FIG. 3A, the second pointer is moved so that the second pointer is associated with the user interface element 324. The first pointer remains associated with the user interface element 312 and the second pointer remains associated with the user interface element 332.

During an alignment iteration, the module 110 also attempts to align sequences of one or more user interface elements as long as each user interface element in the sequences has not already been adjusted in the iteration. Returning to the example, because the user interface element 322 has not been adjusted, e.g., the user interface element 322 is associated with an alignment indication value of zero, the sequence including user interface elements 322 and 324 is used for comparison. Comparing the sequence to the user interface elements 312 and 332, the module 110 determines that the sequence of user interface elements including the user interface elements 322 and 324 can be increased by 30 pixels or less, depending on the height of white space between the two user interface elements, to align the bottom edge of the sequence, i.e., the bottom edge of the user interface element 324, with the bottom edges of the user interface elements 312 and 332.

Figure 3C:
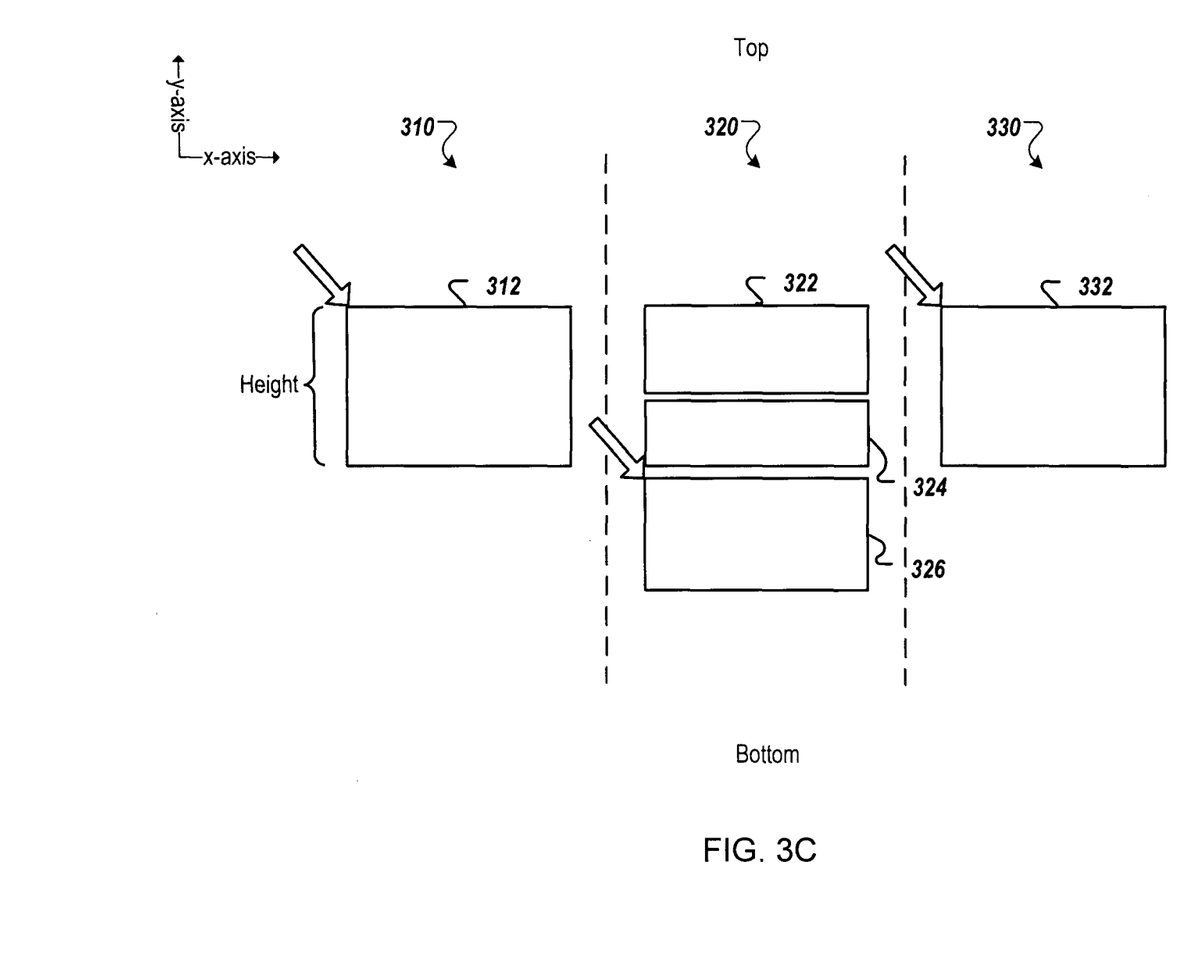
FIG. 3C is a block diagram illustrating the example user interface elements of FIG. 3B after another user interface element is aligned.

FIG. 3C is a block diagram illustrating the example user interface elements of FIG. 3B after another user interface element is aligned. In particular, the sequence of user interface elements including the user interface elements 322 and 324 is aligned with the user interface elements 312 and 332. After the adjustment, the alignment indication values of the user interface elements 322 and 324 can be set to indicate that the user interface elements 332 and 324 have been adjusted (and should not be adjusted again in the current alignment iteration).

The comparisons and adjustments are performed until each pointer is associated with a user interface element nearest the bottom of a respective column. As shown in FIG. 3C, the second pointer is moved so that it is associated with the user interface 326, because the second pointer was not associated with a user interface element nearest the bottom of the second column 320, and the second pointer was associated with a user interface element that was nearer to the top of the columns than user interface elements pointed to by the first pointer and the third pointer.

In some implementations, the adjustment applied to a sequence of user interface elements is divided proportionally among the user interface elements based on their original heights. In the example, if an adjustment to be applied to the sequence is 30 pixels, the user interface element 322 can be increased by 16 pixels, an approximation of $$30 \cdot \frac{200}{200+180}$$

pixels. The user interface element 324 can be increased by 14 pixels, an approximation of $$30 \cdot \frac{180}{180+200}$$

pixels.

Figure 3D:
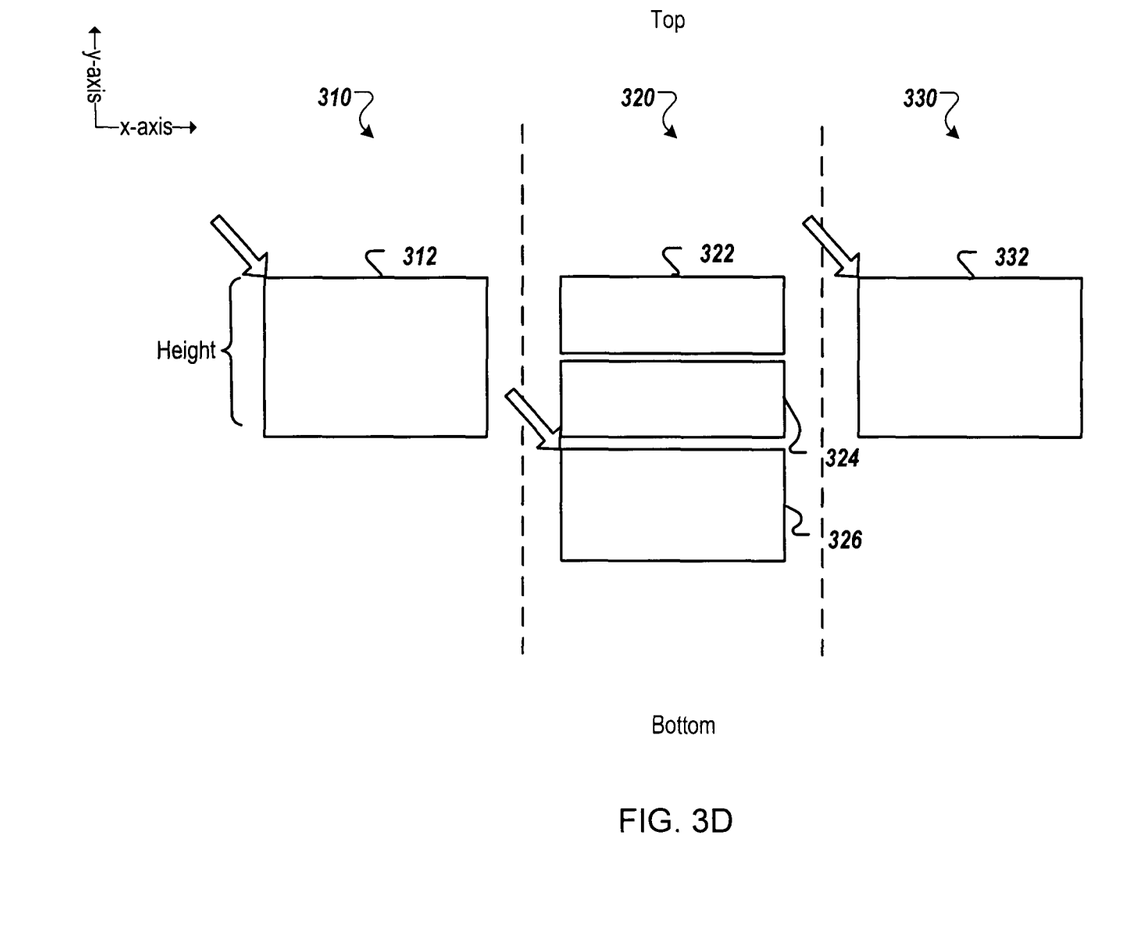
FIG. 3D is a block diagram illustrating the example user interface elements of FIG. 3C in another implementation.

FIG. 3D is a block diagram illustrating the example user interface elements of FIG. 3C in another implementation. In some implementations, the adjustment applied to a sequence of user interface elements is divided among the user interface elements so that the user interface elements in the sequence each have a substantially equal height (e.g., within X pixels of each other, where 0≤X≤50). For example, if the adjustment to be applied to the sequence is 30 pixels, the height of the user interface element 322 can be increased by 5 pixels to a new height of 205 pixels, and the height of the user interface element 324 can be increased by 25 pixels to a new height of 205 pixels.

In some implementations, aligning the user interface elements includes identifying a reference user interface element.

Figure 4:
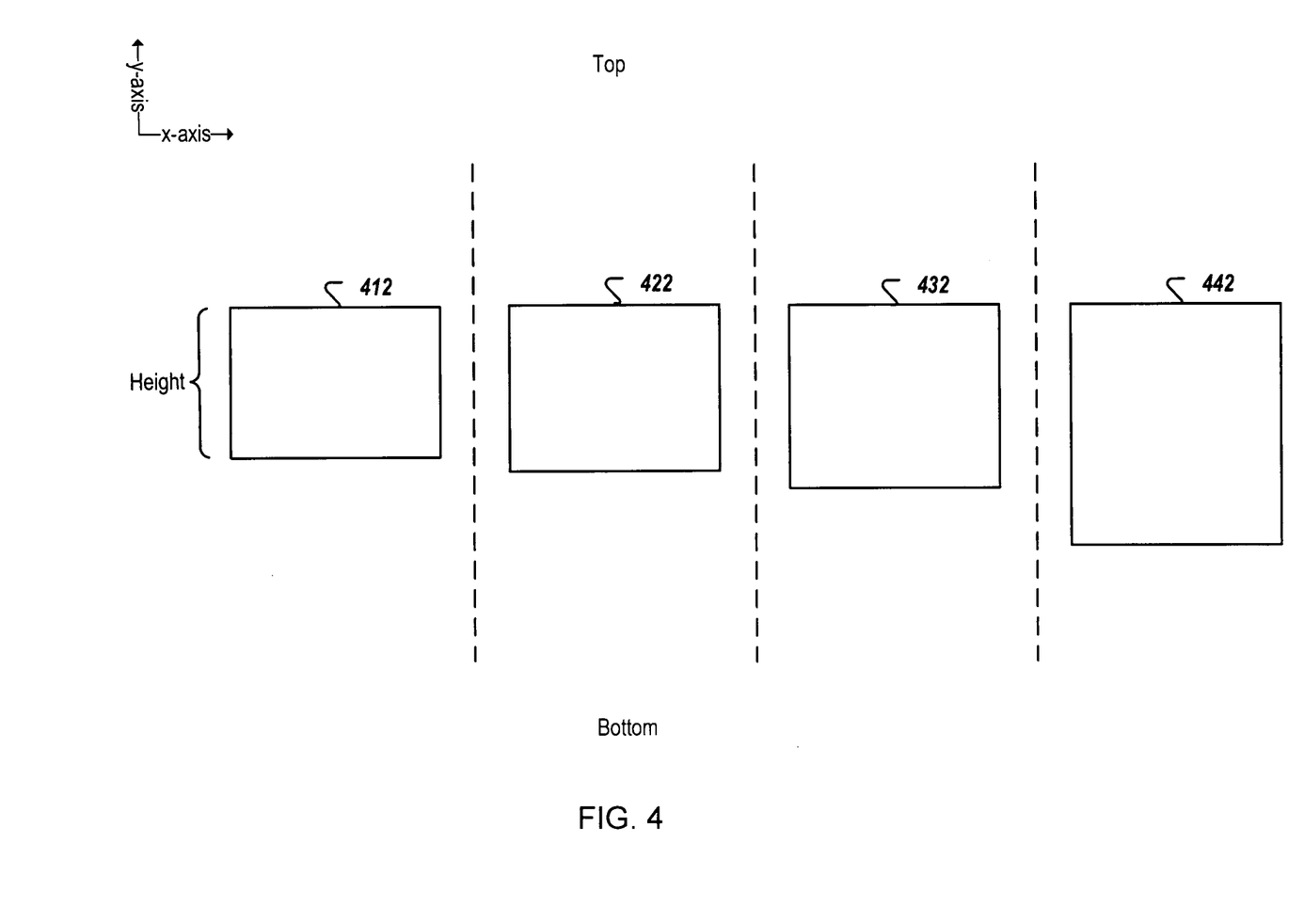
FIG. 4 is a block diagram illustrating example user interface elements arranged in four vertical columns.

FIG. 4 is a block diagram illustrating example user interface elements arranged in four vertical columns. The arrangement includes a user interface element 412 in a first column, a user interface element 422 in a second column, a user interface element 432 in a third column, and a user interface element 442 in a fourth column.

In a group of two or more columns, e.g., adjacent columns of user interface elements displayed in a user interface, the reference user interface element can be identified as being the user interface element that, when compared to the other user interface elements in the other columns, maximizes the number of other columns in the group that include user interface elements that can be aligned with the reference user interface element using accepted adjustments. The module 110 attempts to adjust the heights of user interface elements in the other columns so that the user interface elements in the other columns align with the reference user interface element.

In the example, the heights of the user interface elements 412, 422, 432, and 442 are 600 pixels, 610 pixels, 630 pixels, and 660 pixels, respectively. If a threshold adjustment value is 80 pixels, then the user interface element 442 is identified as being the reference user interface element because increases of heights that are less than 80 pixels can be applied to the user interface elements 412, 422, and 432 during the alignment of the user interface elements 412, 422, 432, and 442. If the threshold adjustment value is 25 pixels, then the user interface element 432 is identified as being the reference user interface element during the alignment of the user interface elements 412, 422, and 432. Note that the user interface elements 412, 422, and 432 cannot be aligned with the user interface element 442 using an accepted adjustment when the threshold adjustment value is 25 pixels.

As described above, user interface elements can be arranged in a vertical column, i.e., arranged vertically in a column across a user interface. In addition, columns can be arranged horizontally across a user interface (e.g., in a row).

Figure 5:
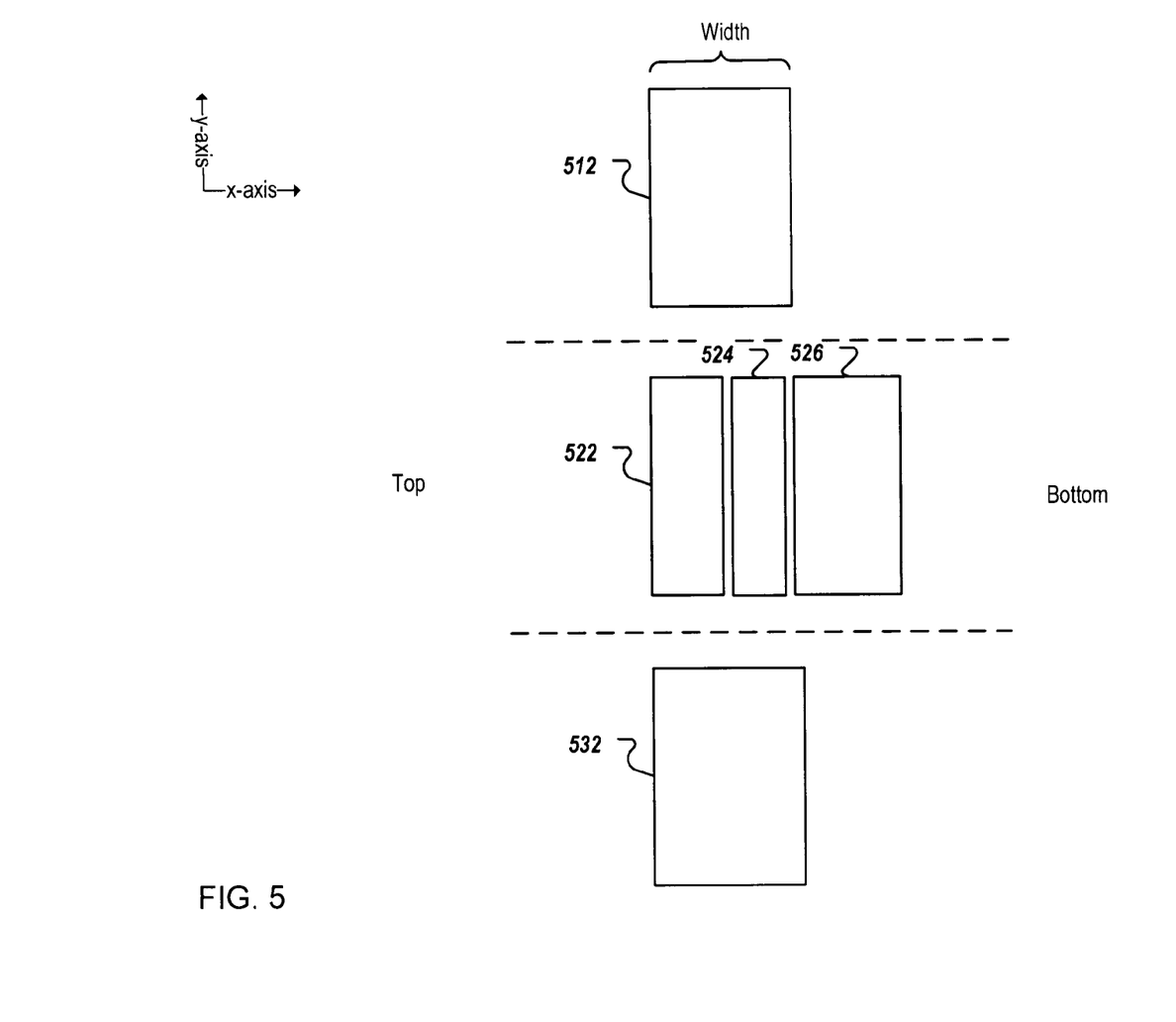
FIG. 5 is a block diagram illustrating example user interface elements arranged in three horizontal columns.

FIG. 5 is another block diagram illustrating example user interface elements arranged in three columns. In particular, user interface elements 512, 522, 524, 526, and 532 are arranged in three horizontal columns (e.g., three rows) as indicated by the horizontal dotted lines that run parallel to the x-axis (e.g., a horizontal dimension). In practice, the dotted lines are not displayed.

The user interface elements can be aligned in a manner similar as described above with respect to FIGS. 3A, 3B, 3C, 3D and 4. In particular, the techniques described above can be used to align user interface elements arranged in horizontal columns by comparing and adjusting the widths of the user interface elements (e.g., dimension along the x-axis).

Figure 6:
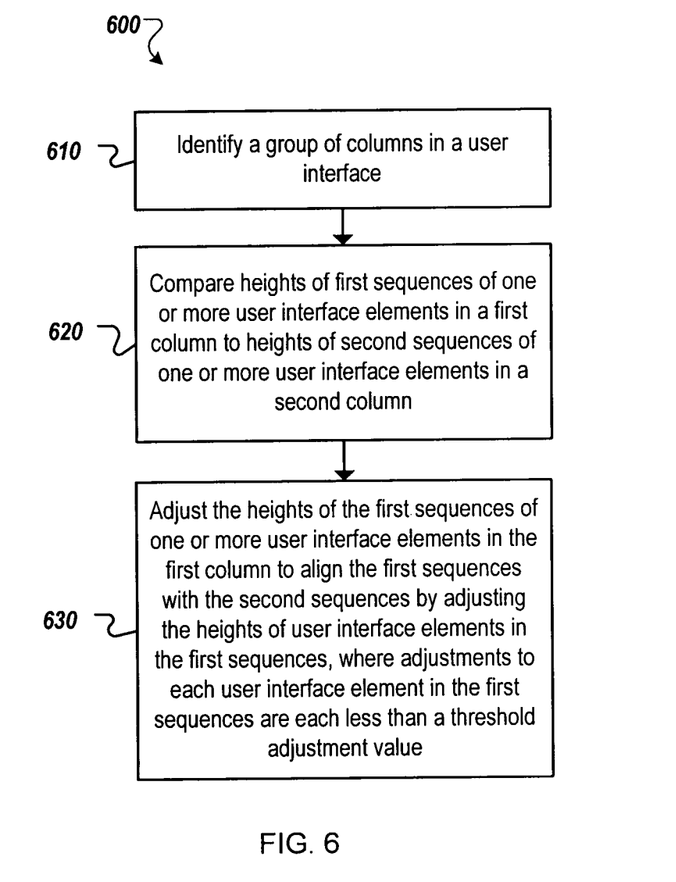
FIG. 6 is a flow chart showing an example process for automatically aligning user interface elements.

FIG. 6 is a flow chart showing an example process 600 for automatically aligning user interface elements. The process 600 includes identifying 610 a group of columns in a user interface. Each column in the group includes one or more user interface elements arranged in a sequence from a top of the column to a bottom of the column. The process 600 also includes comparing 620 heights of first sequences of one or more user interface elements in a first column to heights of second sequences of one or more user interface elements in a second column. The process 600 also includes adjusting 630 the heights of the first sequences of one or more user interface elements in the first column to align the first sequences with the second sequences by adjusting the heights of user interface elements in the first sequences. Adjustments to each user interface element in the first sequences are each less than a threshold adjustment value.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program, also known as a program, software, software application, script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   identifying a group of columns in a user interface, where each column in the group includes one or more user interface elements arranged in a sequence from a top of the column to a bottom of the column;
   for each other column that includes an initial user interface element that can be aligned with a reference initial user interface element in a first column using a height adjustment that is less than a threshold adjustment value:
      adjusting, by one or more computers, the height of the initial user interface element in the other column to align the initial user interface element with the reference initial user interface element;
   selecting, from the other columns that do not include an initial user interface element that can be aligned with the reference initial user interface element using a height adjustment that is less than the threshold adjustment value, a first other column having an initial user interface element having a bottom edge that is closest to the top of the other column;
   determining a first sequence of user interface elements that includes the initial user interface element from the first other column and a second interface element directly below the initial user interface element in the first other column;
   determining whether the first sequence can be aligned with the reference initial user interface element using a height adjustment that is less than the threshold adjustment value; and
   in response to determining that the first sequence can be aligned with the reference initial user interface element using a height adjustment that is less than the threshold adjustment value, adjusting, by the one or more computers, the heights of the user interface elements in the first sequence of user interface elements in the first other column to align the first sequence with the reference initial user interface element.

2. The method of claim 1, further comprising: determining that the heights of the initial user interface elements have not been previously adjusted.

3. The method of claim 1, further comprising:
   monitoring the user interface for a trigger event, and where the identifying, comparing and adjusting is performed automatically in response to detecting the trigger event.

4. The method of claim 3, where the trigger event indicates that a user interface element has been deleted or modified.

5. The method of claim 3, where the trigger event indicates that a user interface element has been loaded.

6. The method of claim 1, where the adjusting of the initial user interface element includes increasing the height of the initial user interface element.

7. The method of claim 1, where each of the initial user interface elements adjusted to align with the reference initial user interface element has a substantially equal height to the height of the reference initial user interface element after being adjusted.

8. The method of claim 1, where the columns are horizontal columns.

9. The method of claim 1, where the initial user interface elements are not aligned before the adjustment.

10. A computer program product, stored on a non-transitory computer-readable medium, operable to cause data processing apparatus to perform operations comprising:
    identifying a group of columns in a user interface, where each column in the group includes one or more user interface elements arranged in a sequence from a top of the column to a bottom of the column;
    for each other column that includes an initial user interface element that can be aligned with a reference initial user interface element in a first column using a height adjustment that is less than a threshold adjustment value:
       adjusting, by one or more computers, the height of the initial user interface element in the other column to align the initial user interface element with the reference initial user interface element;
    selecting, from the other columns that do not include an initial user interface element that can be aligned with the reference initial user interface element using a height adjustment that is less than the threshold adjustment value, a first other column having an initial user interface element having a bottom edge that is closest to the top of the other column;

determining a first sequence of user interface elements that includes the initial user interface element from the first other column and a second interface element directly below the initial user interface element in the first other column;

determining whether the first sequence can be aligned with the reference initial user interface element using a height adjustment that is less than the threshold adjustment value; and in response to determining that the first sequence can be aligned with the reference initial user interface element using a height adjustment that is less than the threshold adjustment value, adjusting, by the one or more computers, the heights of the user interface elements in the first sequence of user interface elements in the first other column to align the first sequence with the reference initial user interface element.

11. The computer program product of claim 10, the operations further comprising determining that the heights of the initial user interface elements have not been previously adjusted.

12. The computer program product of claim 10, where the operations further comprise:

monitoring the user interface for a trigger event, and where the identifying, comparing and determining is performed automatically in response to detecting the trigger event.

13. The computer program product of claim 12, where the trigger event indicates that a user interface element has been deleted or modified.

14. The computer program product of claim 12, where the trigger event indicates that a user interface element has been loaded.

15. The computer program product of claim 10, where the adjusting of the initial user interface element includes increasing the height of the initial user interface element.

16. The computer program product of claim 10, where each of the initial user interface elements adjusted to align with the reference initial user interface element has a substantially equal height to the height of the reference initial user interface element after being adjusted.

17. The computer program product of claim 10, where the columns are horizontal columns.

18. A system comprising:

a machine-readable storage device including a program product; and one or more processors operable to execute the program product and perform operations comprising:

identifying a group of columns in a user interface, where each column in the group includes one or more user interface elements arranged in a sequence from a top of the column to a bottom of the column;

for each other column that includes an initial user interface element that can be aligned with a reference initial user interface element in a first column using a height adjustment that is less than a threshold adjustment value:

adjusting, by the one or more processors, the height of the initial user interface element in the other column to align the initial user interface element with the reference initial user interface element;

selecting, from the other columns that do not include an initial user interface element that can be aligned with the reference initial user interface element using a height adjustment that is less than the threshold adjustment value, a first other column having an initial user interface element having a bottom edge that is closest to the top of the other column;

determining a first sequence of user interface elements that includes the initial user interface element from the first other column and a second interface element directly below the initial user interface element in the first other column;

determining whether the first sequence can be aligned with the reference initial user interface element using a height adjustment that is less than the threshold adjustment value; and in response to determining that the first sequence can be aligned with the reference initial user interface element using a height adjustment that is less than the threshold adjustment value, adjusting, by the one or more processors, the heights of the user interface elements in the first sequence of user interface elements in the first other column to align the first sequence with the reference initial user interface element.

\* \* \* \* \*